United States Patent [19]
Sandberg

[11] 4,108,499
[45] Aug. 22, 1978

[54] METHOD AND CONTROL SYSTEM FOR CONTROLLING A SUSPENDED IMPLEMENT

[75] Inventor: Nils Arne Sandberg, Hassleholm, Sweden

[73] Assignee: Ingenjorsfirman N A Sandbergs Industrikonstruktioner AB, Hassleholm, Sweden

[21] Appl. No.: 737,163

[22] Filed: Oct. 29, 1976

[30] Foreign Application Priority Data

Nov. 3, 1975 [SE] Sweden ............................ 75122655

[51] Int. Cl.² .................... B65G 53/04; E02F 3/88
[52] U.S. Cl. ............................... 302/34; 37/58; 37/72; 37/195; 37/DIG. 1; 210/525; 254/173 R; 302/42; 302/58; 302/66; 318/648; 318/489
[58] Field of Search ................ 210/525, 172, 91; 15/1.7, 3, 9, 246.5; 302/42, 34, 33, 17, 15, 58; 37/DIG. 1, 58, 67, 64, 72, 195; 340/267 R, 282; 254/173 R, 168; 318/489, 648

[56] References Cited

U.S. PATENT DOCUMENTS

| | | | |
|---|---|---|---|
| 3,254,355 | 6/1966 | Shaw | 15/1.7 |
| 3,273,942 | 9/1966 | McFarland | 302/34 X |
| 3,380,179 | 4/1968 | Schmidt | 37/67 X |
| 3,416,176 | 12/1968 | Ravitts | 15/1.7 |
| 3,534,857 | 10/1970 | Berk | 210/525 X |
| 3,690,731 | 9/1972 | Mylting | 302/42 |
| 3,846,781 | 11/1974 | Smith | 340/267 R |
| 3,999,178 | 12/1976 | Hamilton | 340/282 |

FOREIGN PATENT DOCUMENTS

1,074,512   1/1960   Fed. Rep. of Germany .......... 210/525

*Primary Examiner*—Clifford D. Crowder
*Attorney, Agent, or Firm*—Blair, Brown & Kreten

[57] ABSTRACT

A method and a control system for controlling the height level position and horizontal movement of a suction device which is vertically movably suspended from a horizontally movable supporting device according to variations of the inclination, or angular velocity, of a flexible suspending element in relation to the vertical, on which element the suction device is suspended.

7 Claims, 7 Drawing Figures

METHOD AND CONTROL SYSTEM FOR CONTROLLING A SUSPENDED IMPLEMENT

This invention relates to a method and a control system for controlling a suspended vertically adjustable suction implement, such as a suction nozzle or unit comprising a pump with a suction nozzle.

The invention is specifically, but not exclusively, useful as a complement of a control system of the type described in Swedish Pat. No. 384,452 and U.S. Pat. No. 4,037,335 for operating and controlling a mobile suction device which serves to suck suspensible material, such as material sedimented in a liquid, e.g. sludge, sand or other solids particles.

In the above Swedish patent use is made of a suction device in form of a pump and suction means in form of a nozzle which is supported in mobile support means by a wire rope and is vertically adjustable by means of said wire rope, at least one magnitude characteristic of the operation of the suction device and varying in response to the rate of flow per unit of time through the nozzle being sensed for the control of the suction device and variations of this magnitude above predetermined limits being used as signals for controlling at least certain movements of the device, such as the depth level of the nozzle, the movement of the nozzle in a horizontal sense, the change of predetermined motional programs or the control of the suction effect.

If, on being moved from one point to another, the nozzle encounters an obstacle and if the supporting device, e.g. a carriage which carries the nozzle suspended in a wire rope or like element, is moved onwards the wire rope will take an inclined position before the nozzle is dragged over the obstacle. This may give cause to various inconveniences.

One object of the present invention therefore is to provide an apparatus by which such inconveniences are eliminated and by which inclinations of the wire rope can be exploited for controlling purposes.

To this end, the invention relates to a method of controlling, by means of control signals, the height level, horizontal position and/or rate of motion of the suction implement in such installations for sucking material suspensible in gaseous or liquid fluids as include a suction implement suspended in mobile support means and a flexible element between the suction implement and the support means normally stretched by the weight of the suction implement. According to the invention, a change of the inclination of the flexible element to the vertical, such as angular change or angular velocity, is sensed and electric control signals are produced in response thereto and transmitted to control means for controlling the suction implement.

By sensing changes of the inclination of the flexible element it is readily possible to protect the suction implement against disturbances and damages that may otherwise often occcur and to introduce into a predetermined motional program control measures which are necessitated by unforeseen causes, for instance when it is impossible exactly to map the bottom at every point of a region in a liquid body. If the suction implement is moved over an elevation of the bottom or gets caught in an obstacle the angle between the vertical and the flexible element, say a wire rope, in which the suction implement is suspended, will increase and by letting such an increase of the angle release a control measure which for instance reduces the height level of the implement and/or stops the horizontal movement of the implement or reduces the rate of motion thereof, the requisite correcting measures can readily be introduced into an automatic control program, and if the support means of the suction implement is moved at constant speed when a change of the angle of the supporting wire rope to the vertical takes place this change will naturally be dependent upon the rate of motion and it is therefore also possible to bring about the requisite correcting measures in response to angular velocity. A change of the height level, horizontal position and/or rate of motion of the suction implement can thus be optionally realized either in response to the size of the changed angle or to angular velocity. Another example of a change of the inclination of a wire rope for the suction implement is the change of inclination that arises when the movement of the suction implement in a horizontal sense in a liquid body is changed. If the rate of motion is increased the inclination of the wire rope to the vertical will increase and as a consequence the height level of the suction implement will be reduced. A change of inclination for this reason also can be registered and utilized for controlling purposes, say for reducing the horizontal rate of motion or for lowering the suction implement so that the height level of the suction implement above the bottom of the liquid body is kept unchanged.

The invention also relates to a control system for carrying the method into effect, said system including a suction implement suspended in mobile support means and a flexible element between the suction implement and the support means normally stretched by the weight of the suction implement, and control means for controlling the height level, horizontal position and/or rate of motion of the suction implement. According to the invention, the control system includes an inclination indicating device which is connected to the control means and adapted to sense a change of inclination of the flexible element to the vertical, such as a change of the angle of inclination, or angular velocity when the angle of inclination changes, and in response thereto, to produce control signals and transmit said signals to the control means.

In a preferred embodiment the inclination indicating device includes an inclination indicator which is adapted to be mechanically actuated by the flexible element on inclination thereof and to operate, in response to the angle of inclination or angular velocity of the element, an electric circuit for said production of signals. The mechanically actuated inclination indicator is advantageous insofar as it is independent, as for the inclination indication proper, of electrical sensing means, which is of great importance, for instance when work is carried out in inflammable environment, e.g. on sucking of inflammable material suspensible in gaseous fluids, but in many cases also when work is done in moist environment, e.g. in liquids.

Upon application of the present invention to a control system according to the above Swedish patent, for instance a change of inclination, over a certain angle, of the supporting wire rope for the pump and the suction nozzle is sensed by at least one inclination indicator, e.g. an electrode ring, which is connected to a source of current, is supported by the support means and surrounds the wire rope which in turn is grounded. Instead of an inclination indicator of this type use can be made of an inclination indicator actuable by the wire rope and adapted, like the electrode ring, to transmit via a circuit electric control signals to the control system according to the above-mentioned Swedish patent to bring about a control measure by reason of the inclination of the wire rope.

If use is made of electrode rings as inclination indicators a control signal can be produced by direct electric contact or, for instance, by capacitive or inductive action between an insulated electrode ring and the metal wire rope. The number of inclination steps that can be sensed then depends upon the number of electrode rings. With a gravity-actuated inclination indicator (for instance of the pendulum type) inclination changes can be sensed continuously, and via an electric instrument or an electronic signal producer there can be produced either continuous or step-wise correction or control signals.

A control system according to the invention can be used (still with reference to the above Swedish patent) to control an increase or reduction of the travelling speed of the travelling crane in response to the angular deflections of the supporting wire rope and/or to lift the pump and the suction nozzle, for instance via a time lag relay which after a given time again lowers the pump.

As a particular use there should be mentioned cases where the nozzle encounters a big stone, log or rock and need be lifted over the obstacle. Owing to the inclination of the wire rope (the travelling crane continues its travel) an electric signal is released and transmitted to a lifting device for lifting the pump over the obstacle. When the nozzle has passed the obstacle it is again lowered to the intended working level.

When electrode rings are utilized (such rings may have various geometrical shapes and sizes for specific control purposes) the electrode ring should be split or coil-shaped to permit being readily mounted about the supporting wire rope of the pump. Use can be made of several rings of different shapes and sizes at different height levels which may be adjustable for widening or narrowing the limits to the wire rope deflections, at which limits control operations are initiated, and to allow taking out several control signals. Instead of several electrode rings use can be made of a single inclination indicator which may be an instrument of a per se known type and which is so arranged as to sense the inclination of a wire rope between the suction nozzle and its supporting device, and as to operate an electric control circuit. Instruments of this type are available on the market, and the novelty thus resides in the manner in which the instrument is used.

The invention will be described in more detail below with reference to the accompanying drawings in which.

Figure 1:
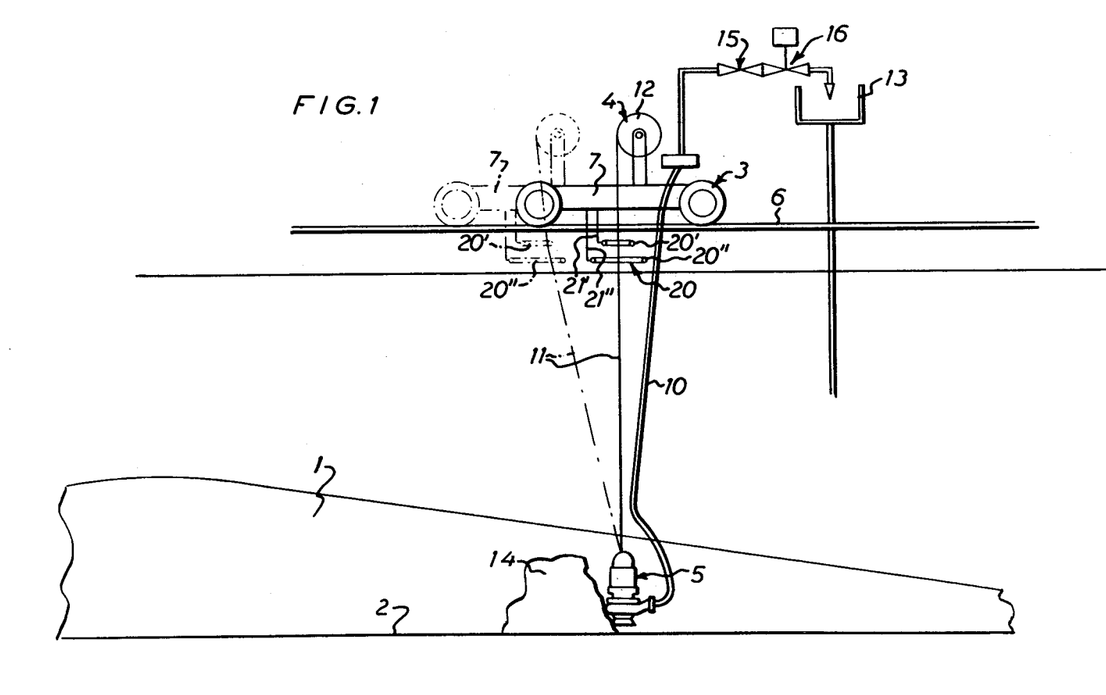
FIG. 1 schematically shows a mobile suction device equipped with an inclination indicator means according to the invention for sucking e.g. sludge, sand or other suspensible material from the bottom of a liquid body.
Figure 2:
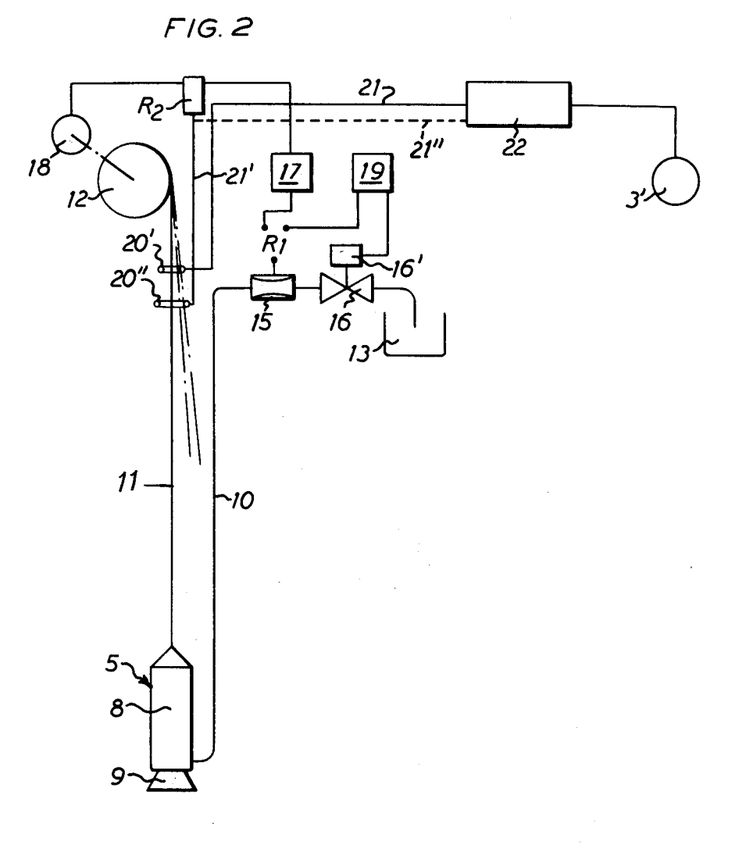
FIG. 2 is a schematic view showing the pump with the suction nozzle and the hoisting means in FIG. 1 and an embodiment of a control system having a wire rope inclination indicator means according to the invention.

FIG. 1 shows a layer 1 of suspensible material, such as sludge or sand, on the more solid bottom 2 of a liquid body. A suction device 5 is supported by transport means 3 above the surface of the liquid body via lifting means 4, and said suction means is movable in two perpendicular directions by the transport means 3 which is here shown in the form of a travelling crane 6 for movement in one direction, and a travelling crane carriage 7 for movement in a direction perpendicular thereto. The means 3 or 6 may, however, be a supporting device of any other kind whatever, for instance a ship. The suction device 5 can be raised and lowered by the lifting means 4 which is carried by the transport means 3. In the illustrated embodiment the suction device 5 is a submergible suction and pressure pump 8 having an electric motor and a suction nozzle 9 for sucking a suspension of suspensible material and water and elevating the suspension through a conduit 10. As illustrated in FIG. 2 the suction nozzle can be arranged in direct connection with the suction side of the pump, the pump 8 and the suction nozzle 9 forming a unit which is carried suspended in a wire rope or other suitable means 11 from hoisting means 12 placed on the carriage 7.

Instead of a submergible pump use could be made of a pump carried by the transport means 3 and connected to a nozzle 9 at the lower end of the conduit 10, said nozzle being raisable and lowerable by the hoisting means.

The suspension conveyed in the conduit 10 is emptied into receiving means 13 for carrying the suspension away or for collecting the solids and, if desired, for separating the liquid.

For the illustration of a problem there is shown in FIG. 1 on the bottom of the suspension an obstacle, say a large stone 14 towards which the pump with the suction nozzle 9 is moved. At a continued movement of the pump with the nozzle 9 to the left as seen in FIG. 1 the pump with the suction nozzle is at best dragged over the obstacle, the supporting wire rope 11 being swung to an inclined position, as indicated by dotted lines. The pump with the suction nozzle can be compared to the weight of a pendulum which, when the pump with the suction nozzle has reached the peak of the obstacle, tends to revert to vertical position. During the movement over the obstacle and in the area after the obstacle suction will be ineffective and may disturb the control programs described in the above Swedish Patent No. 384,452. The obstacle 14 illustrated in FIG. 1 need of course not be a stone or other solid object, but may be for instance a thicker sludge layer which causes a certain lag of the pump/nozzle with respect to the vertical.

The control equipment in FIG. 2 comprises a flow meter 15 connected to the conduit 10 and preferably being a magnetic flow meter of any known type, and an electrically operated control valve 16 likewise connected to the conduit 10. The flow meter 15 may be arranged to be connected via a relay at $R_1$ to an electric governor 17 for governing an electric drive motor 18 for the hoisting means 12 (which is for instance a wire rope drum) and to an electric regulator 19 for regulating the valve 16.

Arranged about the supporting wire rope 11 and cooperating therewith is a wire rope inclination indicating (inclination sensing and inclination transmitting) device which is electrically connected via a line 21 to a governor connected to a source of current, said governor being for instance a frequency converter 22 which is comprised in the control equipment and is used for governing an electric motor for the drive wheels of the travelling crane 6 and/or an electric motor for the drive wheels of the carriage 7, these drive wheels being symbolically illustrated at 3′ in FIG. 2.

The desired flow rate can be set with the aid of the governor 17 or the regulator 19. The governor 17 can be set for instance in order to keep the flow rate at a constant value Q1 by governing the hoist motor 18 so that the suction nozzle of the pump, for instance a suction socket 9 of rubber or plastics, is kept in a position for definite throttling against the solid bottom or bed of material, and with the aid of the regulator 19 a constant flow rate Q2 can be set by adjustment of the regulating valve 16.

The nozzle 9 can be moved by the transport means 3 in a direction along the bottom for instance at a selected speed v m/min. When the nozzle passes a thicker layer of material (or an obstacle) a lag of the nozzle (or increased lag, if the rate of motion is supposed to have given the wire rope a certain initial inclination) occurs with regard to the vertical. In the embodiment shown in FIGS. 1 and 2 the metal wire rope 11, which is connected to ground, is adapted to cooperate with an inclination indicator 20 consisting of one or more electrode rings. Electric contact between an electrode ring 20′ and the wire rope is established at a predetermined inclination of the wire rope, and this contact may function as a make contact which lowers the rate of motion of the transport means 3 via the frequency converter 22. The reduction of the rate of motion can be realized to a definite fraction of a preselected travelling speed v m/min. When the contact between the electrode ring and the wire rope ceases this make contact is broken and the travelling speed increases to the original rate v m/min.

FIGS. 1 and 2 also show a second electrode ring 20″ which has a larger diameter than the first electrode ring 20′ and is placed below said first ring. The lower electrode ring 20″ may be adapted upon contact with the wire rope to stop the travelling crane and/or the travelling crane carriage and/or to provide a positive raising of the pump by a given amount via a line 21″ and a relay $R_2$. This relay may be a time lag relay which carries out the raising of the pump in response to a time setting. The nozzle can then be automatically lowered by means of the governor 17 and the hoist means 12, and the pump can be regulated by means of the regulator 19 and the valve 16 for restoring the flow rate to a constant value Q1. Regulation continues until the pump has reached a preset lower position and the flow rate again corresponds to the amount Q1 to be maintained, the travelling movement of the travelling crane being again initiated.

The time lag relay $R_2$ may for instance be adapted, on receiving a signal from the inclination indicating device 20, first to raise the pump and then after a given time again to lower the pump. If the control equipment includes a regulator for flow regulation, such as the valve 16 in the conduit 10, the flow regulator can also be used to sense any tendency of clogging in the conduit 10 by transmitting, at a decreasing flow rate, a control signal via the relay $R_2$ to the motor 18 for raising the nozzle 9 whereby the pump 8 pumps relatively more water and cleans the conduit. Raising of the nozzle normally results in an altered inclination of the wire rope 11 (if the nozzle is moved at unaltered speed), and this change of inclination can be sensed by the device 20, for instance for modifying the travelling speed of the travelling crane or the travelling crane carriage.

The inclination indicating device 20 can also be used for special control tasks in specific works. The pump 8 may for instance be preset with the aid of the regulator 19 for a capacity lower than the maximum capacity, for instance 50–80% of the maximum capacity, to work for instance against a sand bed in a liquid body. By the use of a suitably shaped suction nozzle 9 and by a suitable adjustment of the nozzle relative to the sand bed the nozzle can be caused to erode the sand bed during suction. With the aid of the flow meter 15 and the governor 17 the depth level of the pump/nozzle is governed so that the nozzle, while sucking eroded sand, is allowed to work downwards, forming a well in the sand bed. The pump adjusts itself with the aid of the control system in which the flow meter 15 senses the volume pumped by the pump. If the volume increases this is an indication of the possibility for a further lowering of the pump, whereas a decreasing volume is an indication of the necessity to raise the pump. Volume-dependent signals can be transmitted by means of the electromagnetic flow meter 15 to the governor 17 for setting the height level and horizontal position of the pump (the suction nozzle) by control of the hoist and transport means. When the pump is raised and moved by the transport means 3 one step in a forward direction in order thereafter to allow the nozzle to work downwards toward the solid bottom substrate at a new point, the movement of the nozzle over the rim of the well it has formed in the sand bed can be sensed by means of an inclination indicator according to the invention by the lag of the pump and the ensuing inclination of the wire rope 11 at the movement over the "well rim". By a signal produced by the inclination the movement of the travelling crane 6, the travelling crane carriage 7 or other device for moving the lifting means 4 can be stopped while lifting is carried out, for instance via a time lag relay to which the electrode ring 20′ or 20″ is connected, so that the pump 8 with the nozzle 9 is thereby placed in a new position at a suitable distance from the former working position, whereupon the time lag relay automatically lowers the pump toward the sand bed.

Inclination indicators according to the invention can be utilized in such a manner that the rate of motion of the transport means 3 is regulated by the inclination of the wire rope for instance by its resistance to motion in pure water. If the inclination increases, the rate of motion is reduced and vice versa, or for instance in such a manner that the pump is moved as close as possible to the bottom of a sedimentation basin while sucking sedimented material. The control system in FIG. 2 combined with a wire rope inclination indicating device according to the invention can thus be arranged so as to provide automatic running of the installation for the most effective work also in the presence of obstacles over which the pump with the suction nozzle may need to be lifted and at which obstacles the transport means 3 need be stopped or slowed down to allow the suction nozzle to work for a longer time.

If electrode rings are used as wire rope inclination indicators a first ring can be used for speed increase and a second ring for speed reduction, while the speed of the transport means 3 (the travelling crane 6 and/or the travelling crane carriage 7) can be kept constant between the areas where the wire rope 11 contacts neither the first nor the second electrode ring.

As already mentioned in the introduction, the contact need not be a physical one, i.e. control signals can also be obtained by physically contact-free electric actuation of an electrode ring by the supporting wire rope 11 (or a supporting chain or other electrical conductor). The electric signal pulse can be obtained for instance by capacitive or inductive actuation upon contact with an insulated electrode ring.

Figure 3:
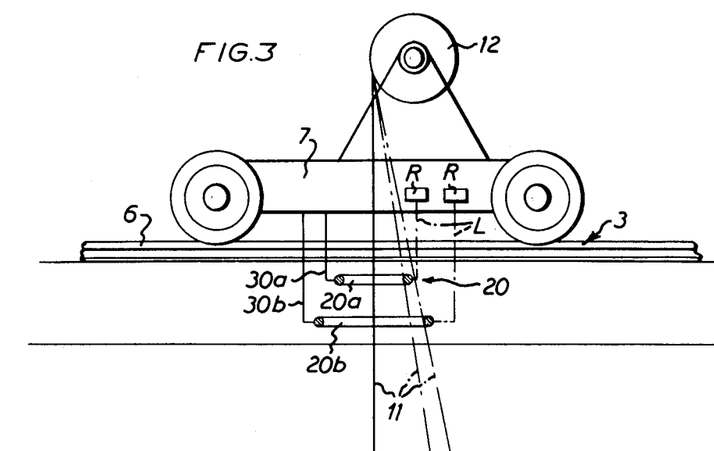
FIGS. 3 and 4 show some alternative arrangements according to the invention of inclination indicators in the form of electrode rings.
Figures 4, 5:
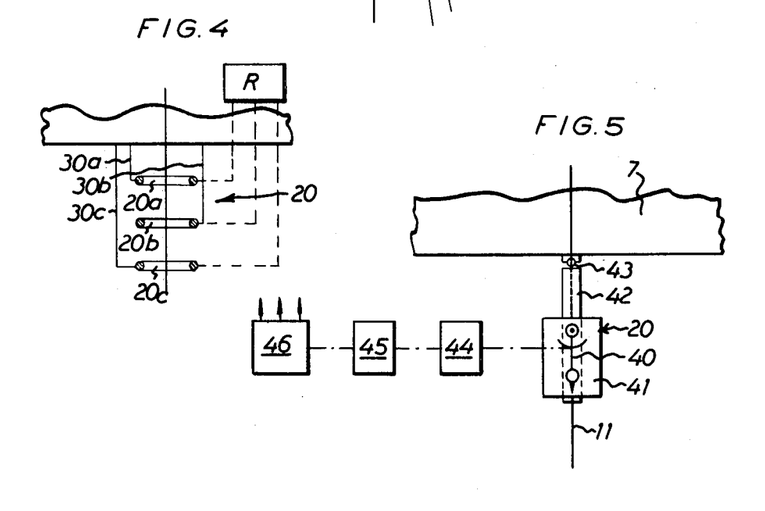
FIG. 5 shows a part of a control system which includes a pendulum type inclination indicator.

FIGS. 3 and 4 show some examples of arrangements of electrode rings according to the invention for cooperation with a line which may be a grounded supporting wire rope 11. The upper electrode ring 20a is mounted on an electrode ring holder 30a suspended in the travelling crane carriage and surrounds the wire rope 11. By a similar holder 30b a second electrode ring 20b is supported in a position below the first ring 20a. The lower electrode ring 20b may have a larger diameter (FIG. 3) than the first electrode ring 20a so that the wire rope 11 on being inclined to the vertical first contacts the upper electrode ring 20a. On further inclination the wire rope 11 will come in contact with the second electrode ring 20b which is placed at a lower level. The electric signals produced at a contact with two rings are exploited for control purposes according to the above description.

FIG. 4 shows three electrode rings 20a, 20b, 20c which are carried by resilient holders 30a, 30b, 30c. In principle, any one of the three rings can be arranged first to contact the wire rope 11. At a further angular deflection of the wire rope the resiliently suspended electrode ring is carried along whereby the wire rope 11 can be moved into contact with one of the other two electrode rings, whereupon this ring also is carried along. Finally, the wire rope will come in contact with the third electrode ring. The contact sequence may be for instance the same sequence 20a, 20b, 20c as the level sequence from above and below, but may also be for instance 20b-20a-20c.

It is indicated in FIGS. 3 and 4 how the electrode rings are electrically connected by lines L to electric control means R which are operated by electric signals upon contact between the respective electrode ring and the wire rope 11. From the control means R the signals are fowarded to the means in the system which are to be controlled.

The electrode rings may be split or for instance coil-shaped in order to permit being readily mounted about the wire rope 11, and the rings may be of different sizes and shapes. Instead of a round shape which in normal cases will be the most suitable one, use may be made for instance of rings of square, rectangular, hexagonal shape, etc.

FIG. 5 shows an embodiment in which use is made of an inclination indicator 20 including a pendulum 40 or other mobile means which is kept adjusted by gravity, and a frame 41 which for instance by means of a tube 42 through which passes the wire rope 11 is pivoted at 43 to the carriage 7 so that the frame can be swung by the wire rope. Relative movements between the frame and the vertically hanging pendulum capacitively, inductively or resistively actuates an electric circuit for the production of a signal which can be amplified by means of an amplifier 44. The amplifier 44 in its turn can actuate a counter (of the type reversible counter) 45 which is connected to a control system 46, e.g. of the type shown in FIG. 2, for delivering instruction control signals when the inclination changes exceed certain angular values determined by the setting of the counter 45. A device of this kind can operate with a far greater sensitivity and exactitude than the electrode ring arrangement described and can be arranged in such a manner as to produce control pulses for predetermined adjustable angles of inclination.

Figures 6, 7:
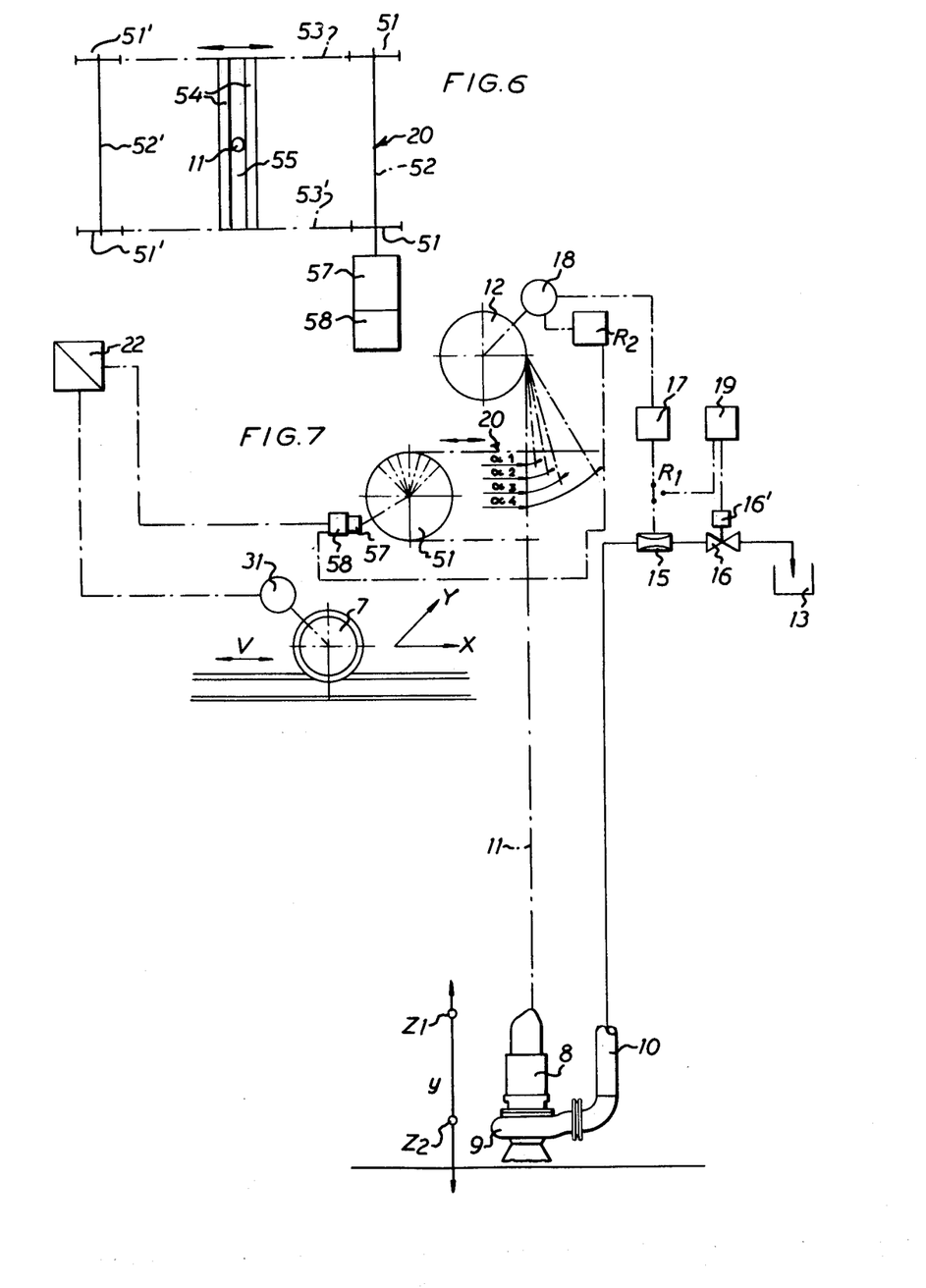
FIG. 6 shows an inclination indicator in the form of a previously known angle-changing instrument.
FIG. 7 shows an example of control equipment in which use is made of the inclination indicator in FIG. 6.

FIG. 6 very schematically shows an inclination indicator 20 cooperating with the wire rope 11 and being in the form of a so-called angle changing instrument of a per se well-known type. This instrument includes a frame suspended in the carriage 7 (neither the carriage 7 nor the frame is shown in FIG. 6) which carries two pairs of sprockets 51, 51' on shafts 52, 52' common to the respective pairs. Said shafts extend along two parallel sides of a rectangle at the corners of which the sprockets are located and along the two other parallel sides of which there runs a pair of chains 53, 53' which extend each over its pair of sprockets. A chain dog 54 extends between the two parallel upper runs of the chains, said dog having a guide 55 through which the wire rope 11 can run freely. The dog 54 follows the lateral movements of the wire rope at an inclination of the wire rope and transmits the movement to the chains 53, 53' and via said chains to the sprocket wheels and the shafts 52, 52'. One shaft 52 actuates a transmission 57 which in turn operates a signal transmitter 58 directly or via an angle transmitter of a type known per se. The signal transmitter or the angle transmitter can be arranged to produce a full signal level or full deflection for an angular change of from 0° to 90° and the signal transmitter can be arranged to transmit control signals of e.g. the size of up to 20 mA for proportional control, as the degree of inclination of the wire rope produces a proportional signal current. Conversely, a given signal level corresponds to a given inclination. Naturally, step-wise control can also be provided, i.e. the arrangement can be such that control pulses of for instance the size m/A is transmitted each time the inclination of the wire rope 11 exceeds definite treshold values which can be set in the instrument. Thus different degrees of inclination of the wire rope 11 can produce a series of control pulses.

FIG. 7 schematically shows an electric control circuit in which components bearing the same reference numerals as in FIG. 2 also have equivalent tasks and are not therefore described in more detail. In FIG. 7 several positions of the wire rope 11 are indicated, and more particularly a vertical position and three (or more) positions in different-size inclinations $\alpha 1$, $\alpha 2$, $\alpha 3$ which influence the instrument 20 and produce different control signals, possibly in different control circuits, from the signal transmitter 58 for instance for regulating the travelling speed of the travelling crane and/or the travelling carriage 7 to a speed corresponding to a definite lag of pumps at different inclinations of the wire rope for work according to a preset program and for raising or lowering the pump, which can take place via the time lag relay $R_2$, another time lag relay or another governor, for instance a frequency converter similar to the converter 22.

Signals from the signal transmitter 58 can also be transferred to the regulator 16' for adjustment of the regulating valve 16, for instance via 19 and $R_1$ in FIG. 7.

The automatic control system in FIG. 7 can operate for instance in the following manner.

The pump having the suction nozzle is in an initial position which may be called $x_o y_o z_o$. At the start of the installation the following operations are carried out automatically.

The travelling crane moves to a position which may be called $x_1$. In this position (carriage 7 in position $y_o$) the pump starts. The controller $R_2$ lowers or raises the pump from position $z_o$ in response to the flow rate which is sensed by the flow meter 15 so that a predetermined flow rate is obtained and maintained. When the pump has reached its correct position Z, or a lowermost position $Z_2$, the travelling movement of the travelling crane carriage and/or the travelling crane automatically starts (by a signal from the control means 15, 17, $R_2$ and 22) at a certain speed between a maximum speed and a minimum speed which can be called $V_{max}$ and $V_{min}$ and depends upon the lag of the pump in the sludge (inclination of wire rope 11). The control means 15, 17, $R_2$ the motor 18 and the hoist means 12 raise or lower the pump to maintain the flow rate. Two events may now occur:

(1) The pump may be raised above a desired preset work position $z_1$ because the sludge concentration increases. When the pump passes the preset position $z_2$ the travelling movement stops and while the movement is stopped the pump is adjusted vertically upward or downward depending upon the sludge concentration until the pump reaches a position z determined by the preset sludge concentration, or possibly a lowermost position, e.g. a bottom position, $z_2$, at which the travelling movement again starts.

(2) The pump may lag so that the wire rope 11 by its inclination reaches a deflection equal to say $\alpha 3$, which corresponds to a high sludge concentration, the pump being positively raised for a time set by the time lag relay or another controller $R_2$ and passes the height position $z_1$, which stops or slows down the travelling movement. The control means 15, 17 also in this case take over the control function in order, when the pump eventually again reaches for instance its lowermost position $z_2$, to initiate the travelling movement.

Operating cycles (1) and (2) continue until the pump has worked its way through the sludge. By increasing and reducing the travelling speed with the aid of the inclination indicator 20 and the control means operated thereby and by raising and lowering the pump by means of the flow meter and the control means operated thereby, with the nozzle throttled against the bottom or the sludge (as a control releasing magnitude), there is obtained a sludge suction device which automatically pumps up the sludge in predetermined sludge concentrations independently of the depth and concentration of the sludge lying in the sedimentation basin. If it is desired to control the flow rate without throttling the pump against the bottom of the basin or against the sludge this can be realized with the aid of the regulator 19 for instance according to a separate supplementary control program.

In the foregoing, mention has been made of the pump 8 as if it were a submergible pump equipped with the nozzle 9 and suspended in the wire rope 11 and mention has also been made of sludge and basin bottom but it will of course be realized that the pump 8 proper could be carried by the travelling crane carriage 7 and the nozzle 9 by the wire rope 11 and that the suction device could be used for elevation of fluidizable material other than sludge, e.g. gravel, from the bottom of liquid bodies, or material suspensible in air such as grain, or like products.

Further, it should be emphasized that the term "inclination indicator" for the device 20 is meant to imply that said device 20 either senses the inclination of the wire rope continuously or senses a certain inclination limit or limits and, proportionally to the change of inclination or when predetermined inclination limits are exceeded, produces a control signal for a control function. Some of the most important control functions have been described, but it should be added that the inclination indicator device may have a further important control function, namely the one that a stop signal is transmitted when the pump (the nozzle) gets caught in some object at the bottom or when the pump works its way too deeply into sludge or gravel and when material collapsing over the pump immobilizes said pump, said stop signal interrupting all operations and possibly releasing an alarm signal. This signal can be transmitted for instance at an inclination $\alpha 4$ in FIG. 7. This will spare int. al. the conduit (hose) 10 and prevent the pump from being torn loose.

What I claim and desire to secure by Letters Patent is:

1. Apparatus for controlling the position of a suspended travelling implement in relation to a carriage above and solely supporting said implement through a wire comprising:
   conduit means connecting said implement to a receiving means for conveying material thereto;
   a flow rate sensor disposed in said conduit which monitors the flow rate of the conveyed material;
   first means responsive to said flow rate sensor which alters the length of wire between said carriage and said implement to maintain said flow rate within preset limits so as to compensate for varying density strata of material to be conveyed;
   second means for both moving said carriage and therefore said implement along within a certain velocity range;
   third means for measuring a lag between said implement and said carriage;
   and fourth means for adjusting the velocity of said carriage when said third means measures a lag between said implement and said carriage by an angle said wire defines relative to absolute vertical.

2. The apparatus of claim 1 in which said third means includes a plurality of electrical rings symmetrically overlying said wire between said carriage and said implement when the carriage velocity is zero which have a change in electrical field when said wire is angulated relative to said rings thereby providing a measure of lag between said carriage and said implement.

3. The apparatus of claim 2 in which there are two rings of different diameter.

4. The apparatus of claim 2 in which there are three rings.

5. The apparatus of claim 1 in which said third means includes a tube symmetrically overlying said wire between said carriage and said implement when the carriage velocity is zero which has a change in electrical field when said wire is angulated relative to said tube thereby providing a measure of lag between said carriage and said implement.

6. The apparatus of claim 1 in which said third means includes a chain dog overlying said wire which oscillates linearly with said wire, linkage means connected to said chain dog which transfers this oscillation to a transmission, and a signal transmitter which is driven by said transmission which determines the angular orientation of said wire and thereafter alters the carriage velocity through said fourth means.

7. A method of controlling a suspended implement relative to a moving, overlying, supporting carriage comprising:
providing a material conveyor on said implement;
monitoring the flow rate of the material conveyed;
adjusting the flow rate of the material conveyed within limits by raising or lowering said implement thereby changing the density of the strata that the conveyor encounters;
determining the angle between a wire connecting said implement and said carriage with absolute vertical, and modifying said angle by altering the velocity of the carriage relative to said implement.

* * * * *